Figure 1:
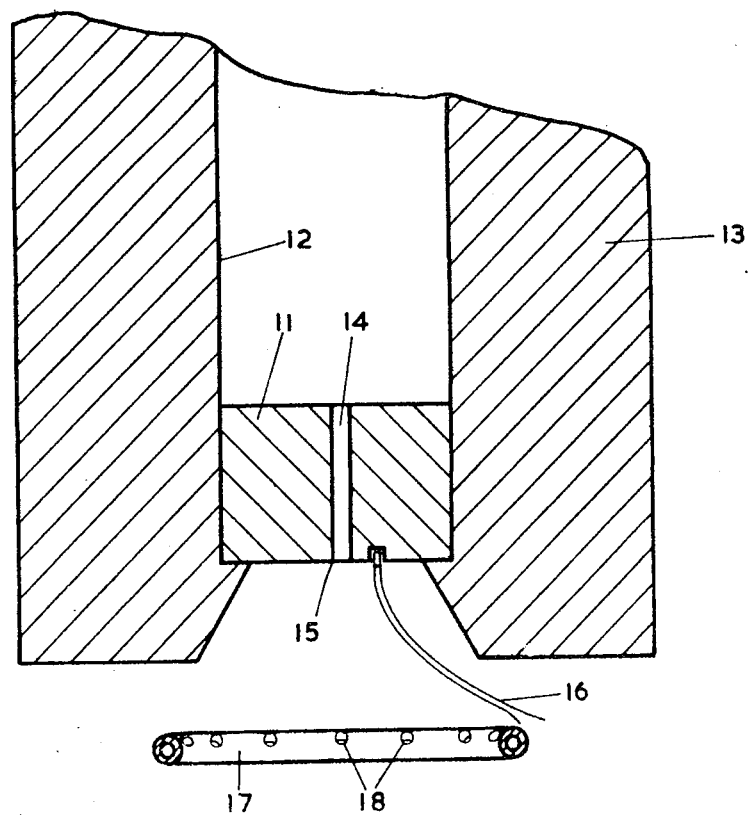

United States Patent [19]
Cogswell

[11] 3,920,782
[45] Nov. 18, 1975

[54] SHARKSKIN

[75] Inventor: Frederic Neil Cogswell, Welwyn Garden City, England

[73] Assignee: Imperial Chemical Industries Limited, London, England

[22] Filed: July 3, 1973

[21] Appl. No.: 376,205

[30] Foreign Application Priority Data
July 12, 1972  United Kingdom............... 32559/72

[52] U.S. Cl................ 264/98; 264/148; 264/176 R; 264/209; 264/237; 264/348
[51] Int. Cl.². ................... B29C 17/07; B29D 23/03
[58] Field of Search ..... 264/98, 99, 209, 95, 176 R, 264/237, 348, 349, 148; 425/72, 326 R, 378, 326 B

[56] References Cited
UNITED STATES PATENTS

| | | | |
|---|---|---|---|
| 2,541,201 | 2/1951 | Buecken et al. .................... | 264/349 |
| 2,795,821 | 6/1957 | Williams ............................. | 264/211 |
| 3,057,013 | 9/1962 | Loveless ............................. | 264/348 |
| 3,125,619 | 3/1964 | Miller ................................. | 264/348 |
| 3,168,207 | 2/1965 | Noland et al. ........................ | 264/98 |

FOREIGN PATENTS OR APPLICATIONS

| | | | |
|---|---|---|---|
| 1,479,973 | 3/1967 | France ............................... | 264/209 |
| 230,105 | 9/1960 | Australia............................. | 264/209 |

*Primary Examiner*—Jeffery R. Thurlow
*Attorney, Agent, or Firm*—Cushman, Darby & Cushman

[57] ABSTRACT

Sharkskin formed during extrusion of polymeric materials may be controlled or even eliminated by cooling an outer layer of the material so that it emerges from the die with a reduced temperature while maintaining the bulk of the melt at the optimum working temperature.

17 Claims, 4 Drawing Figures

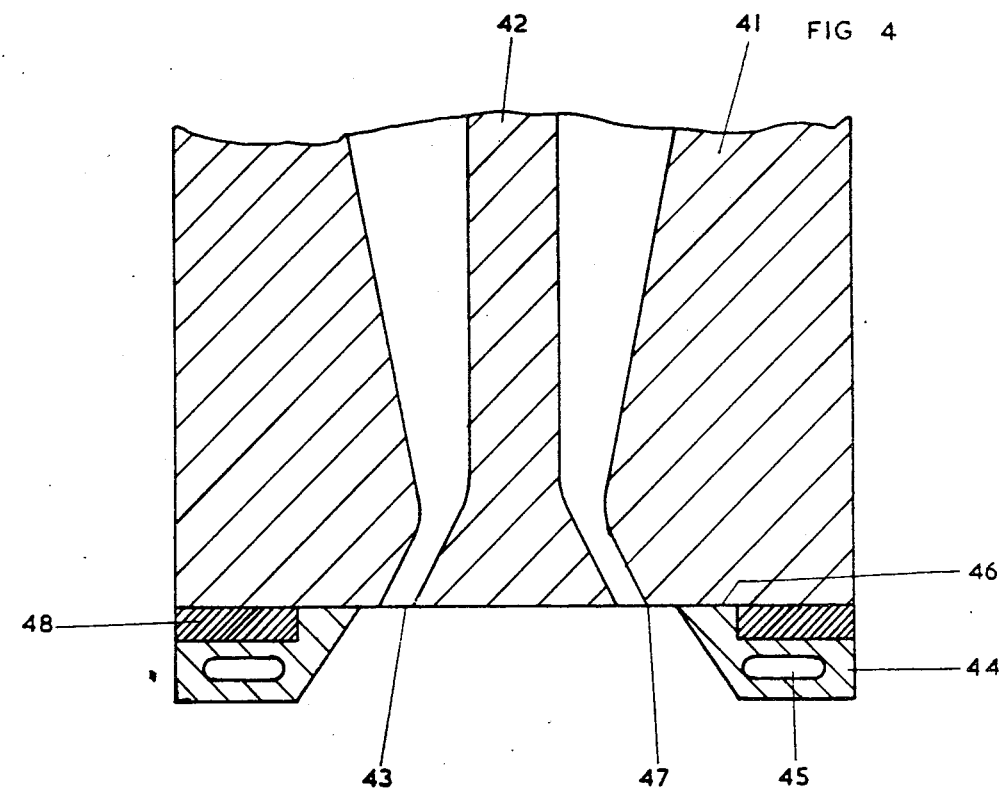

SHARKSKIN

The invention relates to a method of extruding a thermoplastic material capable of producing sharkskin, in such a manner that the amount of sharkskin may be reduced and in some cases eliminated.

"Sharkskin" is a term used to describe a particular type of surface irregularity which occurs during extrusion of some thermoplastic materials under certain conditions. It is characterised by a series of ridges perpendicular to the flow direction and is described, for example, by J A Brydson, Flow Properties of Polymer Melts, pages 78–81, Iliffe Books, London 1970. Sharkskin may be formed during extrusion of several different thermoplastic materials including polyvinyl chloride, polyethylene, acetal copolymers and acrylic polymers, and is particularly noticeable with high molecular weight materials of narrow molecular weight distribution, which materials generally have advantageous mechanical properties which cannot be exploited because of sharkskin formation.

J A Brydson described how the critical linear extrudate velocity for onset of sharkskin rises with temperature, but in practice it is now always convenient to stop sharkskin formation by raising the melt temperature because of possible onset of degradation and because of the difficulty in removing the additional heat without increasing the cycle times. The problem of excess heat may be partially overcome by heating just the tip of the die so that only the outer layer of extrudate is heated above its otherwise normal extrusion temperature.

It has now been discovered that although initial cooling of the melt does increase the formation of sharkskin for most polymers, further cooling beyond a critical temperature reduces the sharkskin. This critical temperature which varies from polymer to polymer, will hereinafter be called the "temperature of maximum sharkskin." Polymeric materials are usually extruded at as low a melt temperature as possible to reduce cycle times, but too great a reduction in melt temperatures risks solidification of the melt within the die, with consequential serious damage to the extruder. In practice the lower limit is usually about that to which the melt temperature rises due to the work done in overcoming the viscosity of the melt, and this lower limit is above the temperature of maximum sharkskin for most polymers. However it has now been discovered further that only the surface of the extruding melt need be cooled to enable an improvement to be obtained.

According to the present invention a method is provided for reducing the incidence of sharkskin during extrusion of a molten sharkskin-forming polymeric material through a die under conditions of extrusion velocity and melt temperature which would otherwise produce sharkskin, which method comprises cooling an outer layer only of the extruding material so that it emerges from the extruder die with the outer layer at a temperature above its solidification temperature but which is sufficiently below the temperature of maximum sharkskin to effect the desired reduction, and thereafter withdrawing the extrudate as an elongated article or subdividing said extrudate to form parisons for blow moulding.

The temperature of the outer layer may be lowered by cooling the die tip to approximately the temperature desired for the outer layer of the polymeric material. In general, the lower the die tip temperature below the temperature of maximum sharkskin, the lower is the amount of sharkskin produced. However, where the die temperature is reduced below the solidification temperature, i.e. the crystalline melting point or for amorphous polymers the temperature corresponding in practice to the crystalline melting point, there is the danger that the die may become blocked with consequent damage to the extruder, and other surface defects may occur progressively with reduced temperature. Temperatures ranging from the solidification temperature to about 15 degrees C above the solidification temperature are usually suitable, but subsequent operations may determine the particular temperature selected. Thus a more rigid skin obtained by using a die tip temperature very close to the solidification temperature, may make subsequent blow moulding more difficult; but alternatively, if higher blowing pressures are available, the orientation which may then be obtained in the surface of the blown article may be advantageous in some applications.

Figure 2:
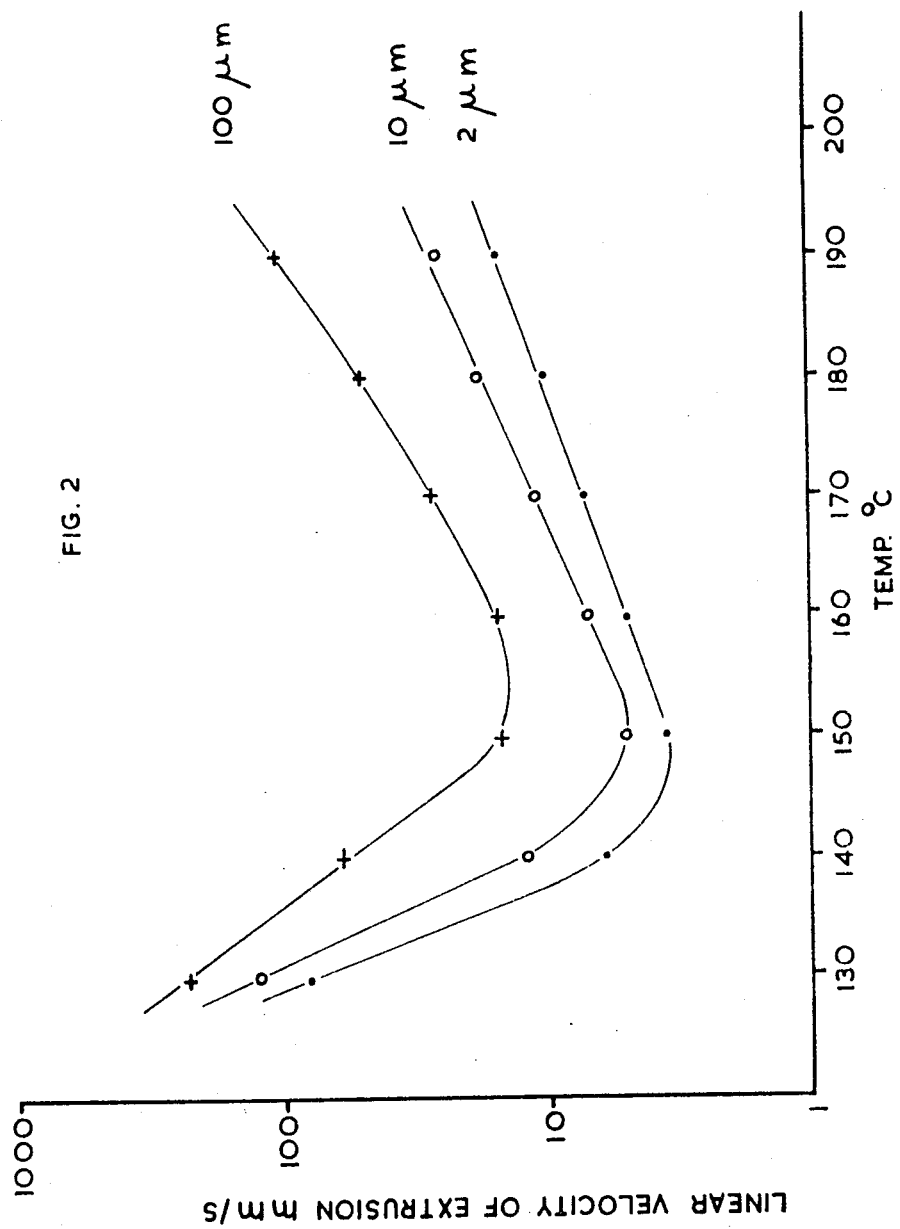
Figure 3:
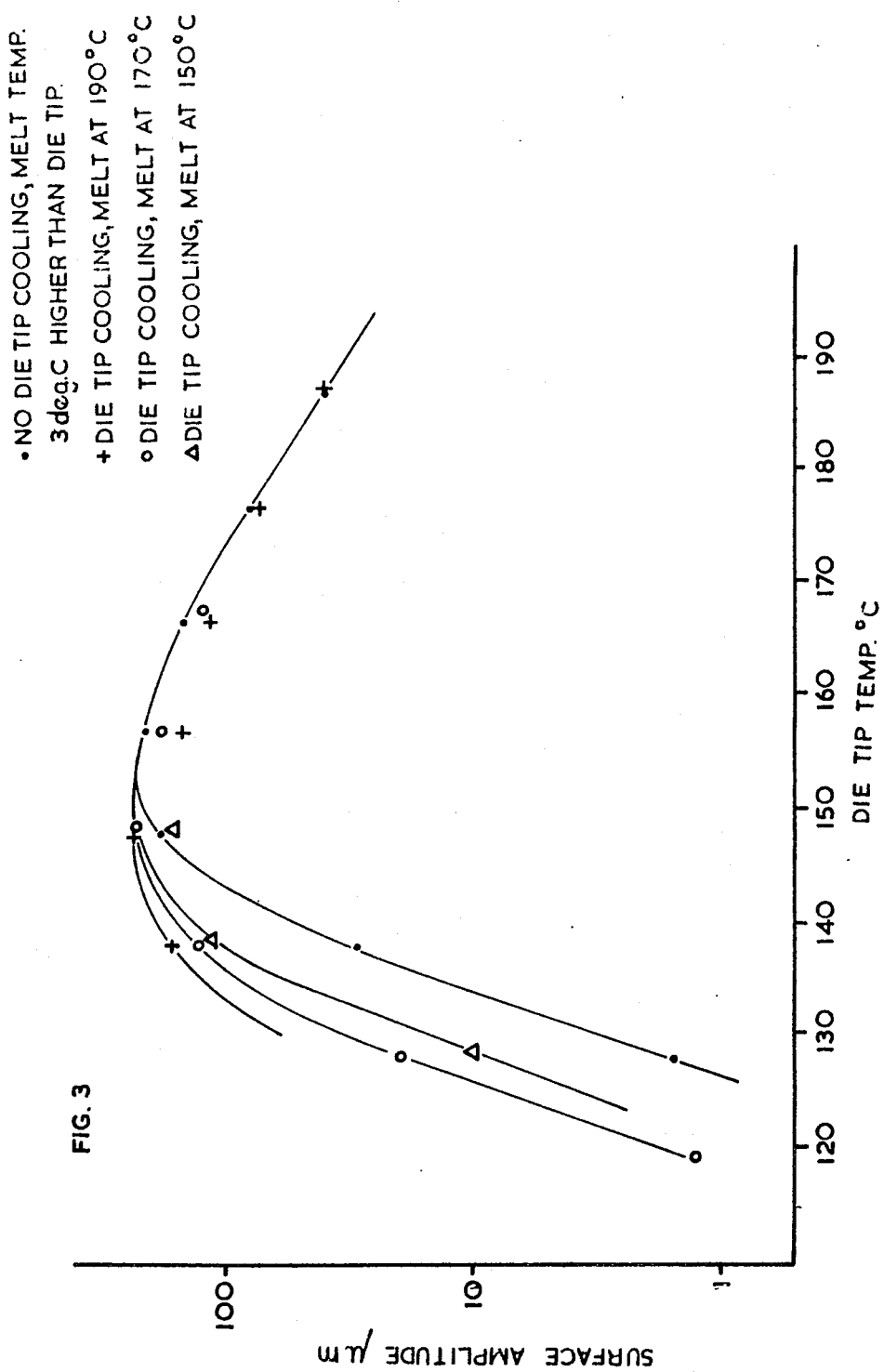

The invention is illustrated by the following brief description of the drawings depicting two embodiments, reference being made to the drawings in which FIGS. 1 and 4 show in section the die of two extruders arranged to provide die tip cooling according to the present invention. The invention is further illustrated by Examples 1 to 4, which describe experiments carried out on the illustrated apparatus, Examples 2 and 4 describing extrusion carried out according to the present method, and Examples 1 and 3 describing comparative experiments. FIGS. 2 and 3 show graphically the results obtained in the experiments of Examples 1 and 2.

In the apparatus illustrated in FIG. 1, a die 11 was supported at the end of an extruder barrel 12 mounted vertically, the walls 13 of which contain the usual heating and insulating means (not shown). The die had a bore 14, 2 mm in diameter and 16 mm in length, terminating in the die tip 15. A thermocouple 16 was silver soldered into a small depression about 2 mm from the die tip. The apparatus was calibrated to show the melt temperature, the die temperature as measued by the thermocouple 16, and the linear velocity of extrusion calculated as $$\frac{\text{volume flow rate}}{\pi \times (\text{radius})^2}$$

Below the die was mounted a circular tube 17 with evenly spaced holes 18 directed partly inwards, and a supply line (not shown) connected the circular tube to a compressed air supply.

EXAMPLE 1

In these experiments, measurements were carried out to determine the maximum sharkskin temperature of a polyethylene of melt flow index (190/2) 0.8 and reference density 939 kg/m³ having a narrow molecular weight distribution evaluation by Gel Permeation Chromatography as $\overline{M}_w$ 76,000, $\overline{M}_n$ 38,000, using an apparatus as illustrated in FIG. 1.

The barrel was filled with the polyethylene and raised to a melt temperature of 130°C. Pressure was then applied to the melt which was then extruded over a range of velocities. The melt temperature was then raised to 140°C and the melt again extruded over a range of velocities. This was repeated at 10° intervals up to 190°C, and each time the range of velocities was adjusted so that the samples ranged from those having smooth glossy surfaces to surfaces which were heavily sharkskinned, eight samples being taken at each temperature. On one evenly ranged sample, the amplitude of the surface was measured as the distance from the depth of the valleys to the peaks of the hills, on a "Talysurf" machine, and this sample was subsequently used as a control against which all the others were compared visually. The measured surface amplitudes were then plotted against the linear extrusion velocity.

Visually, samples having surface amplitudes measuring 2 μm, were smooth and glossy, and appeared to have no sharkskin. At about 10 μm amplitude, the surface became matt, this being the amplitude of the visual onset of sharkskin. Samples having a surface amplitude of 100 μm, were very rough with a high degree of sharkskin.

By interpolation of the above graph of surface amplitude against linear extrusion velocity at constant temperatures, graphs of linear extrusion velocity against temperature were drawn for the three surface amplitudes of 2 μm, 10 μm and 100 μm. The graphs obtained are illustrated in FIG. 2, and show that the polyethylene sampled had a maximum sharkskin temperature of about 150°C. In conventional screw extruders, this polymer would generally be extruded at melt temperatures of about 160° to 170°C, and from the graphs it will be seen that if the polymer could be so extruded at temperatures below about 140°C there would be a reduction in the sharkskin produced for any desired extrusion velocity. This becomes more noticeable as the temperature is reduced to 130°C.

EXAMPLE 2

Using the extruder illustrated in FIG. 1 and a further sample of the same batch of polyethylene as in Example 1, the effect was examined, of cooling the outer layer of the melt while retaining the bulk of the melt at a more normal extrusion temperature. A constant linear extrusion velocity of 37 mm s$^{-1}$ was used, and the results obtained are shown in FIG. 3. Because of the difficulty in measuring the temperature of the outer layer of the melt, the temperature of the die close to the melt was measured by the thermocouple 16 as an approximation to the temperature at which the outer layer of the melt emerged from the die.

As a control, the polymer was initially extruded using a range of melt temperatures, without any positive die tip cooling. The die temperature recorded by the thermocouple 16 was consistently about 3°C lower than the melt temperature due presumably to heat loss to the surrounding atmosphere. The polymer was then extruded at three different melt temperatures 150°C, 170° and 190°C while air was blown from the circular tube 17 to cool the die tip. The surface amplitude was measured for each sample over a range of die tip temperatures, and the amplitude was plotted against the die tip temperature for each set of results.

The graph on FIG. 3 which was obtained without any die tip cooling represents conditions corresponding to those of the graph shown in FIG. 2, the maximum sharkskin again occurring at about 150°C. As will be seen from the drawings, the graphs of results using die tip cooling are not coincident. This could be due to a difference between the measured die tip temperature and the temperature of the polymeric material at the die tip. However, the graphs clearly show that by sufficiently reducing the die tip temperature, the surface amplitude may be reduced considerably below the levels at which it is formed in the absence of die tip cooling.

In Examples 1 and 2 the sample of polyethylene used was selected as being one producing typical results. However, similar results have been obtained with other polymeric materials and examples of these are given in the following table where the temperatures are approximations obtained from a number of practical observations on typical extrusion grades.

| Polymer | Softening Point | Temperature °C | | Die Tip for glossy surface |
|---|---|---|---|---|
| | | Maximum Sharkskin | Normal Extrusion | |
| polyvinyl chloride | 120 | 170 | 180 | 130 |
| polyethylene LD | 115 | 150 | 170 | 130 |
| polyethylene HD | 135 | 160 | 170 | 145 |
| acetal copolymer | 165 | 200 | 190 | 170 |
| homogeneous acrylonitrile/ styrene copolymer | 140 | 180–200 | 200 | 150 |
| polymethyl methacrylate | 140 | 180 | 200 | 150 |

This method of cooling the die tip, i.e. by blowing air onto the die tip from a perforated ring, may be varied in several ways to suit the prevailing requirements. Thus for example a continuous slot may be used in place of the plurality of holes in the ring, and the ring may be replaced by other shapes for other shapes of die tip, i.e. when used for extruding sheet. For most thermoplastic materials it is preferred to use refrigerated air in order to obtain optimum cooling. Other coolants such as a spray of water and air mixture, may be used, but this has been found difficult to control and to prevent it causing solidification of the melt in the die. Moreover, the use of water generally requires subsequent drying of the polymer. These difficulties are further increased if jets of water are used instead of the air/water sprays.

FIG. 4 shows a means of cooling the die tip indirectly. The die 41 has a coaxial mandrel 42 to form an annular orifice 43 and is a conventional die used for extruding cylindrical parisons for blow moulding into bottles. Attached to the face of the die is a heat exchanger 44 having internal passages 45 for circulating a heat exchange medium. The heat exchanger is in direct thermal contact with the area 46 of the die face adjacent the die tip 47 around the annular orifice. It is, however, thermally insulated from the remainder of the face by an insulating layer 48, although some heat may be lost by condensation through the die to the noninsulated area adjacent the die tip.

In the apparatus used in the following Example 4, the heat exchange medium used was refrigerated water from a conventional mould chilling unit used in connection with the blow mould (not shown) used to form bottles from the parisons extruded through the illustrated extrusion equipment. The insulating material used was an asbestos-based sheet sold under the name "Sindanyo," and a "silicone" based grease sold under the trade name "Thermopath" 157 was used to assist transfer of heat between the heat exchanger and the area 46 of the die face which it contacted.

EXAMPLE 3

The die and mandrel of FIG. 4 in the absence of the heat exchanger was used to extrude cylindrical parisons having a wall thickness of about 1.5 mm from a high density polyethylene of narrow molecular weight distribution, the reference density being 970 kg m$^{-3}$ and the melt flow index (190/2) 2.0 The molecular weights, evaluated by Gel Permeation Chromatography were $\overline{M}_w = 112,000$ $\overline{M}_n = 22,000$. The polymer was extruded at melt temperatures varying over the range 160° - 180°C with a linear extrusion velocity in the range 2 to 10 cm s$^{-1}$.

The extrudate had a matt surface of rough texture, surface amplitude being about 100 μm, at all temperatures in the range, particularly at the lower temperatures, and this showed in the moulded bottles.

EXAMPLE 4

The experiment of Example 3 was repeated, but with the heat exchanger in place as illustrated in FIG. 4. Water at about 0°C from the mould chilling unit was circulated through the passages 45.

The extrudate had a glossy surface, and when cooled the moulded bottles had a corresponding glossy surface with a smooth feel. The improvements gained by the die tip cooling were obtained without significantly influencing extrusion pressure or impairing the subsequent inflation process.

Although it is often convenient to use a separate heat exchanger so that this may be used with several alternative dies, this is not essential. When the same die is to be used continuously for extruding sharkskinforming polymers over long periods of time, it may be more convenient to have a heat exchange means built into the die as an integral part.

In the dies illustrated in both FIG. 1 and FIG. 4, in order to facilitate control of die tip temperature, it is generally preferred to use a die having only its face exposed, so that it is less responsive to external temperature variation. Because the margin between the preferred die tip temperature and the softening point is so small, an exposed die can very readily be cooled by a draught, through the few degrees required to freeze the melt against the internal surface of the die.

Heat exchangers of a similar type to that shown in FIG. 4 could be used to cool a wide diameter mandrel (above 10 centimeters diameter), when it is desired to achieve a smooth inside surface as well as or instead of a smooth internal surface. Smaller mandrels could be cooled with heat pipes as described by D Chisholm in his book "The Heat Pipe" (published by Mills & Boon Limited — 1971).

We are aware of the description in British pat. specification No. 969,689 of an extruder die tip being cooled by a blast of cool air, but this was concerned with overcoming a totally different problem which occurred with a different class of polymer under a different set of extrusion conditions. The cooling air blast was provided to maintain any collar formed of the extruded thermoplastic at the die face, below the temperature at which substantial thermal degradation could occur. The problem of collar formation is associated with the extrusion of low viscosity materials at high processing temperatures, being conditions under which they wet the die readily. The collars by being held at the high temperature (generally in the presence of air) for longer periods than the bulk of the extruded material, tend to become discoloured due to thermal degradation, and on eventually breaking away from the die face they contaminate the remainder of the extrudate. This problem becomes more acute as the temperature is increased. Sharkskin, on the other hand, is a surface defect associated with low temperature extrusion of high molecular weight material, and it is a defect which is reduced by increasing the temperature provided the temperature is above the temperature of maximum sharkskin. Hence British Pat. specification No. 969,689 teaches the use of a cooled die tip to cure a problem which becomes more pronounced the further the conditions depart from those at which sharkskin could occur.

Freedom from sharkskin is of particular commercial importance where extruded articles, such as films, sheets or tubes for subsequent blow moulding, require a glossy surface for customer appeal. However, for some applications customer appeal may be increased by varying the degree of gloss or matt textures over selected areas. By selection of the temperature and extrusion velocity, varying degrees of sharkskin may be produced, or the sharkskin may be substantially eliminated. Thus by varying the conditions over the selected areas, patterns may be formed on the extrudate. For example, sheet may be provided with wavy lines of alternating glossy and matt areas by oscillating along the die, a row of spaced-apart air nozzles directing cooling air onto discrete areas of the die tip.

I claim:

1. A method for reducing the incidence of sharkskin during extrusion of a molten sharkskin-forming polymeric material having a narrow molecular weight distribution through a die under conditions of extrusion velocity and melt temperature which would otherwise produce sharkskin, which method comprises cooling an outer layer only of the extruding material so that it emerges from the extruder die with the outer layer at a temperature above its solidification temperature but which is sufficiently below the temperature of maximum sharkskin to effect the desired reduction, and thereafter withdrawing the extrudate as an elongated article.

2. A method as in claim 1 which comprises cooling the die tip to approximately the temperature desired for the outer layer of the polymeric material.

3. A method as in claim 2 which comprises playing a continuous blast of relatively cold gas onto the die tip.

4. A method as in claim 2 which comprises cooling the die tip by passing a cooling medium through a heat-exchanger in thermal contact with the die tip.

5. A method as in claim 1 in which the material remote from the outer layer is extruded from the die at the aforesaid temperature which would otherwise produce sharkskin, while said outer layer is extruded to emerge from the die at a temperature greater than its solidification temperature and less than 15°C above its solidification temperature.

6. A method as in claim 1 comprising extruding the molten polymeric material through a die which is thermally insulated from the environment outside the extruder except for its face or area thereof around the die tip, and continuously directing a blast of cooler gas onto the die tip thereby cooling the tip during the extrusion.

7. A method as in claim 1 which comprises extruding the molten polymeric material through a die having a heat exchanger either integral with the die face or secured thereto in thermal contact with the die tip, the heat exchanger having one or more passages therethrough, and circulating a heat exchange medium through said passages whereby the heat is withdrawn from the die tip during extrusion.

8. A method as in claim 7 in which the heat exchanger is secured to the die face in direct thermal contact with the area of the die face adjacent the die tip, but which is thermally insulated from the remainder of the die face other than by conduction through the die to the area adjacent the die face.

9. A method for reducing the incidence of sharkskin during extrusion of a molten sharkskin-forming polymeric material having a narrow molecular weight distribution through a die under conditions of extrusion velocity and melt temperature which would otherwise produce sharkskin, which method comprises extruding the material through a tubular die, cooling an outer layer only of the extruding material so that it emerges from the extruder die with the outer layer at a temperature above its solidification temperature but which is sufficiently below the temperature of maximum sharkskin to effect the desired reduction, and thereafter subdividing said extrudate to form parisons for blow moulding.

10. A method as in claim 9 which comprises cooling the die tip to approximately the temperature desired for the outer layer of the polymeric material.

11. A method as in claim 10 which comprises playing a continuous blast of relatively cold gas onto the die tip.

12. A method as in claim 10 which comprises cooling the die tip by passing a cooling medium through a heat-exchanger in thermal contact with the die tip.

13. A method as in claim 9 in which the material remote from the outer layer is extruded from the die at the aforesaid temperature which would otherwise produce sharkskin, while said outer layer is extruded at a temperature greater than its solidification temperature and less than 15°C above its solidification temperature.

14. A method as in claim 9 in which the parisons are blow moulded to form shaped articles without further application of heat thereto.

15. A method as in claim 9 comprising extruding the molten polymeric material through a die which is thermally insulated from the environment outside the extruder except for its face or area thereof around the die tip, and continuously directing a blast of cooler gas onto the die tip thereby cooling the tip during the extrusion.

16. A method as in claim 9 which comprises extruding the molten polymeric material through a die having a heat exchanger either integral with the die face or secured thereto in thermal contact with the die tip, the heat exchanger having one or more passages therethrough, and circulating a heat exchange medium through said passages whereby the heat is withdrawn from the die tip during extrusion.

17. A method as in claim 16 in which the heat exchanger is secured to the die face in direct thermal contact with the area of the die face adjacent the die tip, but which is thermally insulated from the remainder of the die face other than by conduction through the die to the area adjacent the die face.

* * * * *